US012762780B2

(12) United States Patent
Williams et al.

(10) Patent No.: US 12,762,780 B2
(45) Date of Patent: Oct. 13, 2026

(54) READ HEAD AND METHODS FOR READING MULTILAYER OPTICAL DATA STORAGE MEDIA

(71) Applicant: Microsoft Technology Licensing, LLC, Redmond, WA (US)

(72) Inventors: Hugh Williams, Cambridge (GB); Serguei Anatolievitch Legtchenko, Crets-en-Belledonne (FR); William Minster Kunkel, IV, Cambridge (GB); Ariel Gomez Diaz, Cambridge (GB); Philip Athelstan Wainman, Hertfordshire (GB); Richard John Black, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 153 days.

(21) Appl. No.: 18/580,880

(22) PCT Filed: Aug. 30, 2022

(86) PCT No.: PCT/US2022/041947
§ 371 (c)(1),
(2) Date: Jan. 19, 2024

(87) PCT Pub. No.: WO2023/034239
PCT Pub. Date: Mar. 9, 2023

(65) Prior Publication Data

US 2024/0371068 A1 Nov. 7, 2024

(30) Foreign Application Priority Data

Aug. 31, 2021 (EP) .................................... 21194152

(51) Int. Cl.
*G06T 15/00* (2011.01)
*G02B 5/30* (2006.01)
(Continued)

(52) U.S. Cl.
CPC ............ *G06T 15/00* (2013.01); *G02B 5/3025* (2013.01); *G03B 13/36* (2013.01); *G06T 7/50* (2017.01); *H04N 23/67* (2023.01)

(58) Field of Classification Search
None
See application file for complete search history.

(56) References Cited

U.S. PATENT DOCUMENTS 10,236,027 B1 3/2019 Georgiou et al.
10,672,428 B1 6/2020 Black
(Continued)

FOREIGN PATENT DOCUMENTS

CN 102280123 B 9/2016
CN 103854675 B 6/2017
(Continued)

OTHER PUBLICATIONS

Anderson, et al., "Glass: A new media for a new era?", 10th USENIX Workshop on Hot Topics in Storage and File Systems (HotStorage 18), 2018, 6 Pages.
(Continued)

*Primary Examiner* — Sarah Le
(74) *Attorney, Agent, or Firm* — Alleman Hall LLP

(57) ABSTRACT

Provided are a read head and methods for reading a multi-layered optical data storage medium comprising a transparent substrate having layers of voxels embedded therein. The read head comprises an imaging system for capturing images of groups of voxels, wherein the read head is configured to bring the imaging system into focus on variable depths in a multi-layered optical data storage medium; and an autofocus system for identifying depth positions of voxels in the multi-layered optical data storage medium by sampling an area in the optical data storage medium. The autofocus system comprises a light source for illuminating
(Continued)

the area; and a detector for detecting light from the light source transmitted through the multi-layered optical data storage medium. A method of reading data from a multi-layered optical storage medium comprises capturing, using an imaging system, images of sectors in a first track. The multi-layered optical data storage medium and imaging system are held at fixed lateral positions during the capture of the images.

20 Claims, 6 Drawing Sheets

(51) Int. Cl.

| | |
|---|---|
| ***G03B 13/36*** | (2021.01) |
| ***G06T 7/50*** | (2017.01) |
| ***H04N 23/67*** | (2023.01) |

(56) References Cited

U.S. PATENT DOCUMENTS

| | | | | |
|---|---|---|---|---|
| 2004/0113043 | A1 | 6/2004 | Ishikawa et al. | |
| 2009/0181339 | A1* | 7/2009 | Liang | A61B 1/24 433/29 |
| 2017/0200468 | A1 | 7/2017 | Zhu | |
| 2018/0201994 | A1* | 7/2018 | Beauchamp | C12N 15/1093 |
| 2019/0075247 | A1* | 3/2019 | Vink | H04N 23/676 |
| 2019/0137255 | A1* | 5/2019 | Chong | G01B 9/02091 |
| 2020/0264798 | A1 | 8/2020 | Xie | |
| 2020/0319085 | A1* | 10/2020 | Pini | G02B 21/0004 |
| 2021/0124889 | A1 | 4/2021 | Adrian et al. | |
| 2022/0187509 | A1* | 6/2022 | Taveniku | H04N 23/676 |

FOREIGN PATENT DOCUMENTS

| | | | |
|---|---|---|---|
| JP | 2000195194 | A | 7/2000 |
| JP | 2013097834 | A | 5/2013 |
| JP | 2015032331 | A | 2/2015 |
| JP | 2015069661 | A | 4/2015 |
| WO | 0141131 | A2 | 6/2001 |
| WO | 2010067256 | A1 | 6/2010 |
| WO | 2016160285 | A1 | 10/2016 |

OTHER PUBLICATIONS

International Search Report and Written Opinion received for PCT Application No. PCT/US2022/041947, Dec. 20, 2023, 16 pages.
“Analog Signal Processing”, accessed on link https://en.wikipedia.org/w/index.php?title=Analogsignal_processing&oldid=889098963, Mar. 23, 2019, 4 pages.
“Flash Memory”, accessed on link https://en.wikipedia.org/w/index.php?title=Flash_memory&oldid=1038270203, Aug. 11, 2021, 32 pages.
“Image Sensor”, accessed on link https://en.wikipedia.org/w/index.php?tMe=Image sensor&oldid=1039758991, Aug. 20, 2021, 7 pages.
“Parity Bit”, accessed on https://en.wikipedia.org/w/index.php?tMe=Parity_bit&oldid=1041533416t, Aug. 31, 2021, 5 Pages.
“Polarizer”, accessed on link https://en.wikipedia.org/w/index.php?title=Polarizer&oldid=1038739991, Aug. 14, 2021, 11 pages.
“Project Silica”, Retrieved From: https://www.microsoft.com/en-us/research/project/project-silica/, 2021, 2 Pages.
“Smart Camera”, accessed on link https://en.wikipedia.org/w/index.php?title=Smart camera&oldid=1031871863, Jul. 4, 2021, 4 pages.
“Track (Disk Drive)”, accessed on link https://en.wikipedia.org/w/index.php?title=Track_(disk_drive)&oldid=925209201, Nov. 8, 2019, 1 page.
“Track (Optical Disc)”, accessed on link https://en.wikipedia.org/w/index.php7title=Track_(optical_disc)&oldid=992921531, Dec. 7, 2020, 3 pages.
Chatzieleftheriou, et al., “Could Cloud Storage be Disrupted in the Next Decade?”, In Proceedings of 12th USENIX Workshop on Hot Topics in Storage and File Systems, HotStorage, 2020, 9 Pages.
Dai, et al., “Encoding Random Hot Spots of a Volume Gold Nanorod Assembly for Ultralow Energy Memory”, Communications, vol. 29, 2017, 8pages.
Day, et al., “Use of Two-Photon Excitation for Erasable-Rewritable Three-Dimensional Bit Optical Data Storage in a Photorefractive Polymer”, Optics Letters, vol. 24, Issue No. 14, Jul. 15, 1999, pp. 948-950.
Extended European Search Report Issued in 21194152.1, Mailed Date: Apr. 21, 2022, 19 Pages.
Gan, et al., “Three-Dimensional Deep Sub-Diffraction Optical Beam Lithography with 9 nm Feature Size”, Nature Communications, Jun. 19, 2013, 7 pages.
Li, et a., “Multifocal Optical Nanoscopy for Big Data Recording at 30 TB Capacity and Gigabits/Second Data Rate”, Optica, vol. 2, Issue No. 6, Jun. 2015, pp. 567-570.
Li, et al., “Three-Dimensional Orientation-Unlimited Polarization Encryption by a Single Optically Configured Vectorial Beam”, Nature Communications, Aug. 14, 2012, 6 pages.
Orlov, Sergei., “Volume Holographic Data Storage”, In Journal Communications of the ACM, vol. 43, Issue 11, Nov. 2000, pp. 46-54.
Search Report Issued in European Patent Application No. 21194152.1, Mailed Date: Feb. 22, 2022, 18 Pages.
Toriumi, et al., “Reflection Confocal Microscope Readout System for Three-Dimensional Photochromic Optical Data Storage”, Optics Letters, vol. 23, Issue No. 24, Dec. 15, 1998, pp. 1924-1926.
Zhang, et al., “High-Capacity Optical Long Data Memory based on Enhanced Young’s Modulus in Nanoplasmonic Hybrid Glass Composites”, Nature Communications, 2018, 6 pages.
Zijlstra, et al., “Five-Dimensional Optical Recording Mediated by Surface Plasmons in Gold Nanorods”, Nature, vol. 459, May 21, 2009, pp. 410-413.
Anderson, et al., “Glass: A New Media for a New Era?”, In Proceedings of 10th USENIX Workshop on Hot Topics in Storage and File Systems, HotStorage, Jul. 9, 2018, 6 Pages.
Office Action Received for Japanese Application No. 2024-513792, mailed on Jun. 22, 2026, 16 pages. (English translation Provided).
Notice of Preliminary Rejection Received for Korean Application No. 10-2024-7007011, mailed on Jul. 31, 2026, 21 Pages. (English Translation Provided).
First Office Action Received for Chinese Application No. 202280058993.0, mailed on Jul. 28, 2026, 23 Pages (English Translation Provided).

* cited by examiner

READ HEAD AND METHODS FOR READING MULTILAYER OPTICAL DATA STORAGE MEDIA

BACKGROUND

There is substantial demand for data storage. It is estimated that cloud storage providers will in the near future need data storage capacities of the order of zettabytes, a zettabyte being one trillion gigabytes ($10^{21}$ bytes). Much of the data will need to be stored for extended periods of time. Examples of data storage technologies currently in widespread use include hard disk drives, magnetic tape, flash memory, and optical discs. All of these technologies have drawbacks which require data to be periodically copied onto replacement media. This is costly in terms of both energy usage and hardware requirements.

Magnetic storage media such as hard drives and magnetic tape suffer from gradual demagnetisation. Flash memory is subject to read disturb effects, where repeatedly reading from a particular flash cell causes failure of surrounding flash cells. The reflective materials used for data storage in optical media such as DVDs chemically degrade over time.

Multi-layered optical data storage media have been proposed as a solution to these drawbacks. A multi-layered optical data storage medium comprises a transparent substrate, such as a quartz glass substrate. Data are encoded in 3-dimensional nanostructures formed in the substrate. These nanostructures are referred to as voxels.

A voxel has optical properties which differ from those of the surrounding bulk substrate. In particular, voxels may be birefringent. In other words, voxels may display different refractive indices depending upon the polarisation and/or direction of incident light. The optical properties of the voxels can be controlled at the time the voxels are written into the substrate. The optical properties of the voxels are used to encode data.

Multi-layered optical data storage media and their manufacture have been described by e.g. Anderson et al, Glass: A New Media for a New Era? 10th USENIX Workshop on Hot Topics in Storage and File Systems (HotStorage 18), 2018; and in U.S. Pat. No. 10,236,027 B1.

Retrieving data from a multi-layered optical data storage medium may involve capturing images of the voxels using an imaging system, and then processing the images to decode the data. The amount of data which can be stored per unit volume depends upon how precisely the imaging system can be focussed on the voxels.

One approach to data retrieval is to keep a record of the positions of the voxels when writing to the storage medium, and then read from those positions. This typically requires the optical data storage medium to be read and written with high positional repeatability, which is only practical on a laboratory scale.

Another approach is to capture images at many predetermined depths. A limitation of this approach is that very little, if any, data can be recovered from images which are out of focus. Thus, it is typical for a majority of the images to be unusable. Image sensors have finite data rates, and the need to capture large numbers of images limits the speed at which data can be retrieved.

There remains a need for an apparatus and method for reading data from multi-layered optical data storage media efficiently.

SUMMARY

In one aspect, there is provided a read head for reading a multi-layered optical data storage medium. The multi-layered optical data storage medium comprises a transparent substrate having layers of voxels embedded therein. The read head comprises an imaging system for capturing images of groups of voxels, wherein the read head is configured to bring the imaging system into focus on variable depths in a multi-layered optical data storage medium; and an autofocus system for identifying depth positions of voxels in the multi-layered optical data storage medium by sampling an area in the optical data storage medium. The autofocus system comprises a light source for illuminating the area; and a detector for detecting light from the light source transmitted through the multi-layered optical data storage medium.

In another aspect, there is provided a method of reading data from a multi-layered optical data storage medium. The multi-layered optical data storage medium comprises a transparent substrate having layers of voxels embedded therein. The method comprises identifying a depth position of a group of voxels in the multi-layered optical data storage medium by sampling the multi-layered optical data storage medium using an autofocus system; and capturing an image of the group of voxels using an imaging system having a focal depth corresponding to the identified depth position. The autofocus system comprises a light source for illuminating an area on the multi-layered optical data storage medium; and a detector for detecting light from the light source transmitted through the multi-layered optical data storage medium.

A still further aspect provides a method of reading data from a multi-layered optical storage medium. The multi-layered optical data storage medium comprising a transparent substrate having layers of voxels embedded therein, the voxels being arranged in sectors and the sectors being arranged in vertical tracks. The method comprises capturing, using an imaging system, images of sectors in a first track. The multi-layered optical data storage medium and imaging system are held at fixed lateral positions during the capture of the images.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Nor is the claimed subject matter limited to implementations that solve any or all of the disadvantages noted herein.

BRIEF DESCRIPTION OF THE DRAWINGS

To assist understanding of embodiments of the present disclosure and to show how such embodiments may be put into effect, reference is made, by way of example only, to the accompanying drawings in which.

DETAILED DESCRIPTION OF EMBODIMENTS

As used herein, the verb 'to comprise' is used as shorthand for 'to include or to consist of'. In other words, although the verb 'to comprise' is intended to be an open term, the replacement of this term with the closed term 'to consist of' is explicitly contemplated.

Directional terms such as "top", "bottom", "left", "right", "above", "below", "horizontal" and "vertical" are used herein for convenience of description. The "top" and "bottom" of an optical data storage medium are taken to be the faces which are parallel to the layers of voxels. For the avoidance of any doubt, this terminology is not intended to limit orientation in an external frame of reference.

As used herein, the "focal depth" of a component is a point on the top-to-bottom (z) axis of the optical data storage medium at which the component is focussed.

A "sector" is a group of voxels which can be imaged simultaneously by an imaging system. A sector is often a substantially planar 2D array of voxels, arranged on an xy plane. Curved sectors are also contemplated.

A "track" is a vertical stack of sectors.

A "transparent" substrate is a substrate which is transparent to light of one or more wavelengths suitable for imaging voxels in the substrate. A transparent substrate may be transparent to light in the infrared, visible, and/or ultraviolet ranges, or any other range of wavelengths.

As used herein, a "wide field" is a field of view with an area of at least 100 $\mu m^2$, optionally an area in the range 125 $\mu m^2$ to 4 $mm^2$. The term "narrow field" refers in particular to a field of view with an area of less than or equal to 10 $\mu m^2$, optionally less than or equal to 2 $\mu m^2$. Described herein is a read head for a multi-layered optical data storage medium which includes an autofocus system for detecting the positions of layers of voxels. The autofocus system samples the optical data storage medium to determine depth positions of voxels. This may allow more efficient use to be made of the imaging system, by allowing images to be captured selectively at depths corresponding to the positions of voxels.

Figure 1:
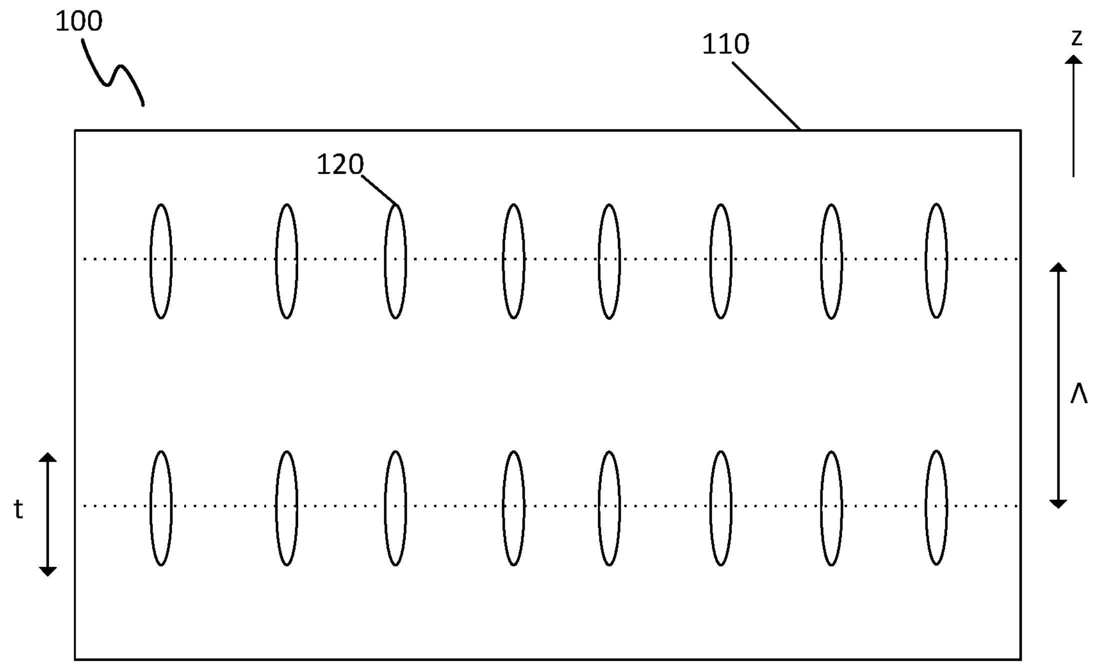
FIG. 1 is a schematic cross-section of an example multi-layered optical storage medium.
Figure 2:
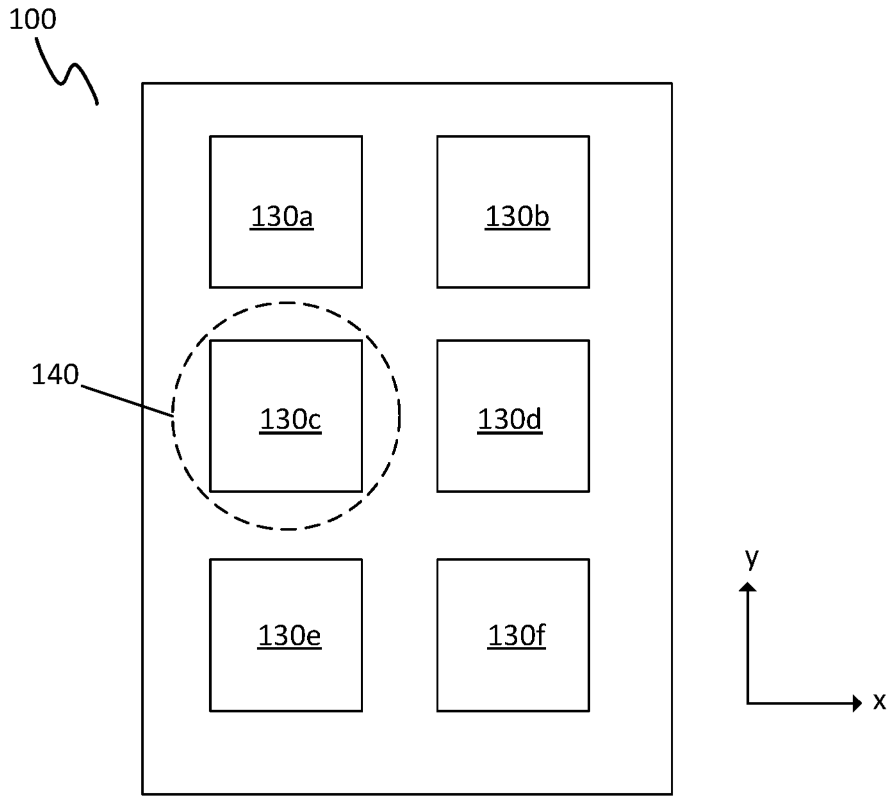
FIG. 2 is a schematic plan view of the multi-layered optical data storage medium.

The structure of an example multi-layered optical data storage medium will first be explained with reference to FIGS. 1 and 2. FIG. 1 is a schematic cross-section of the multi-layered optical data storage medium, and FIG. 2 is a schematic plan view of the multi-layered optical data storage medium.

The data storage medium 100 comprises a transparent substrate 110. The transparent substrate 110 may be a block of glass, in particular fused quartz. Fused quartz may also be referred to as silica glass.

A plurality of voxels 120 are arranged in the transparent substrate 110. The voxels are arranged in layers, each layer including a plurality of voxels. A voxel may be obtainable by focusing a high intensity laser beam, for example a femtosecond laser, on a location in the substrate 110. The laser causes a physical change to the structure of the substrate 110 at that location.

A voxel has a position which can be described by a set of coordinates x, y, z. A voxel may exhibit different refractive indices for light of different polarizations. A voxel may cause a change in the angle of polarization of the light. A voxel has a retardance, which is a measure of the magnitude of the shift between components of the electric field of light when the light interacts with the voxel.

The position, retardance, and change in the angle of polarisation can be controlled by modulating the polarisation, energy, timing, and/or number of pulses of laser light used to write the voxel.

Any combination of these properties of the voxel can be used to encode digital data. For example, a given voxel may store 1 to 4 bits of binary data.

If the data include binary zeros, the zeros are typically encoded in voxels. In other words, zeros are explicitly written into the storage medium rather than being represented by the absence of a voxel. Thus, a group of voxels which stores an array of zeros is distinguishable from blank substrate material.

The substrate 110 has high transparency. The illustration in FIG. 1 shows two layers of voxels. In practice, the number of layers of voxels is not particularly limited. For example, the number of layers may be in the range 1 to 300, and is often at least 10. The substrate may have a thickness of up to 10 mm, optionally up to 5 mm, further optionally 200 μm to 2 mm. By providing a large number of layers in a small surface area, the speed at which the optical data storage medium 100 can be read may be increased, as will be explained in more detail below.

Adjacent layers are spaced from each other by a distance Λ. By way of illustration, Λ may be in the range 5 to 20 μm. The layers of voxels may have a thickness t in the range 1 to 5 μm. The ratio of the thickness of each layer of voxels to the inter-layer spacing is referred to as the duty:

$$\text{Duty} = 100\frac{t}{\Lambda}$$

The duty may be in the range 15 to 25%, optionally about 20%.

FIG. 2 shows a plan view of the multi-layer optical data storage medium 100. As illustrated, that the voxels within a layer may be arranged in sectors 130*a* to 130*f*. A sector is an array of voxels. In this example, the sectors are rectangular arrays. Other shapes are possible. The optical data storage medium may include vertical stacks of sectors. A vertical stack of sectors is referred to herein as a "track".

Data may be read from a multi-layer optical data storage medium by capturing images of the voxels and then processing the images to decode the data. The fraction of data written to the voxels which can be recovered depends upon how precisely the imaging system can be focussed on the voxels. It is desirable to focus the imaging system on the voxels to within a depth tolerance which is as small as possible. A tolerance of +1 μm or smaller may be desired.

FIG. 2 illustrates a field of view 140 of a wide-field imaging system. A wide-field imaging system may capture an image of a plurality of voxels in parallel, as opposed to reading one voxel at a time. A wide-field imaging system typically includes an image sensor having a 2D array of pixels.

The field of view of the imaging system may cover an area which is greater than the area of a single sector. This allows a margin of error in the lateral positioning of the optical data storage medium relative to the imaging system, since the sector may remain readable even if the sector is not centred in the field of view. Optionally, the optical data storage medium may include margins between sectors. After imaging a target sector, or a plurality of target sectors within a vertical track, the imaging system and/or storage medium may be moved to align the imaging system with another track.

In implementations where the optical data storage medium includes margins between tracks, the vertical spacing between sectors within a track may be smaller than a lateral spacing between adjacent tracks. The size of the margins may be selected such that the field of view is aligned with one track at a time. Individual sectors within a track may be read by varying the focus of the imaging system, either using variable focus optics or by relative vertical movement between the imaging system and optical data storage medium. The lateral spacing between tracks may be selected such that voxels of only one sector will appear in each image. It may be easier to recover data from an image of a single sector, compared to an image which includes voxels from two or more sectors.

The layers of voxels in the illustrated example are planar. Other geometries are possible.

The example optical data storage medium is transmissive. To read a transmissive optical data storage medium, the light source for the imaging system and the image sensor of the imaging system are arranged on opposite sides of the data storage medium. Reflective media are also contemplated. A reflective multi-layer optical data storage medium includes a reflective layer below the voxels. When reading a reflective storage medium, read light travels through the storage medium, is reflected from the reflective layer, and then arrives at a image sensor which is on the same side of the data storage medium as the light source.

Figure 3:
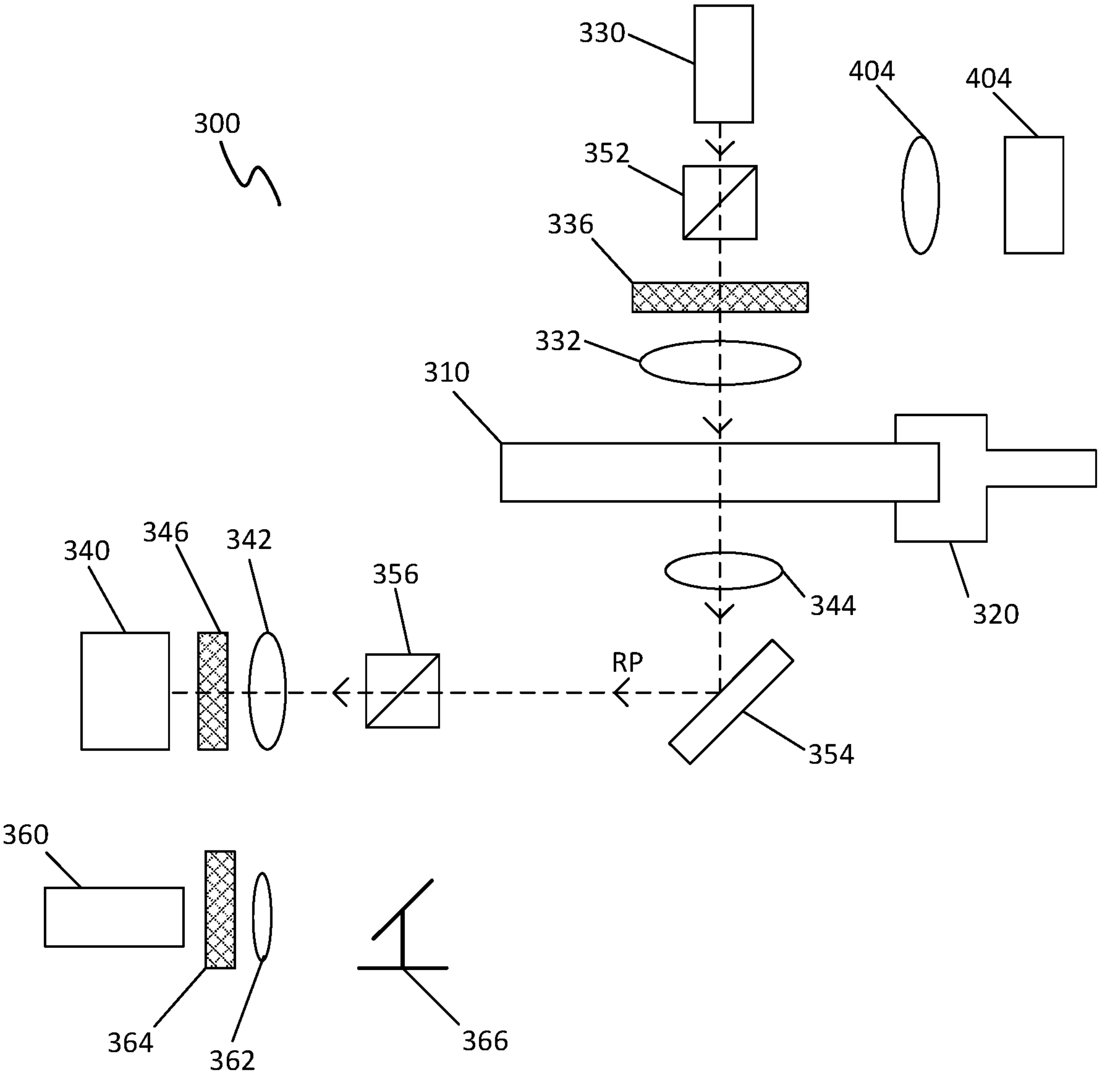
FIG. 3 is a schematic diagram of a read head, showing the path of light through an imaging system of the read head.
Figure 4:
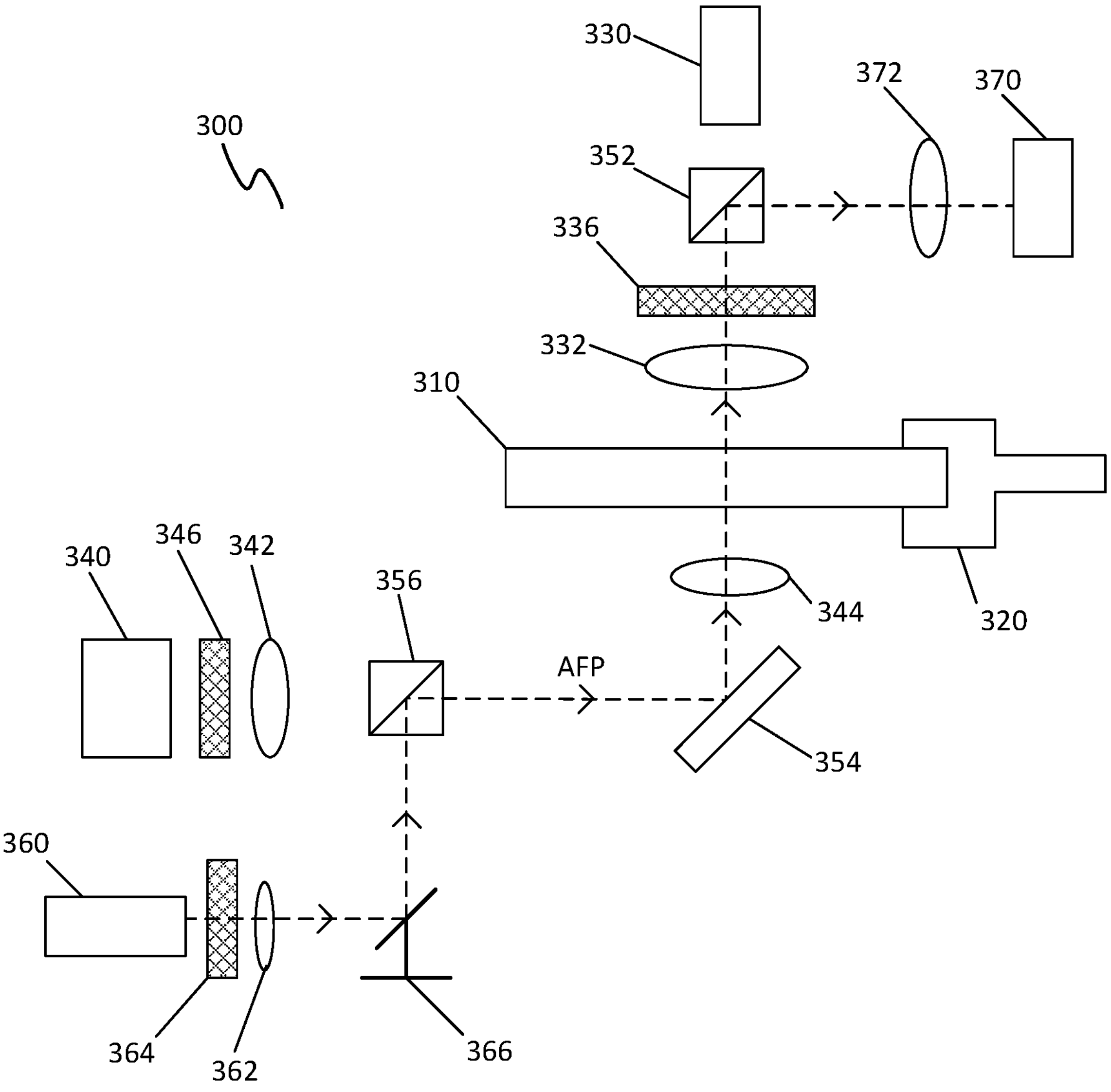
FIG. 4 is a schematic diagram of the read head of FIG. 3, showing the path of light through an autofocus system of the read head.

An example read head 300 for reading a multi-layered optical data storage medium 310 will now be described with reference to FIGS. 3 and 4. FIGS. 3 and 4 are schematic diagrams showing the read head and an optical data storage medium 310 mounted in the read head. The optical data storage medium 310 may be removed when the read head is not in use.

The read head 300 includes an imaging system for capturing images of groups of voxels, an autofocus system for identifying depth positions of voxels, and an actuator for moving the data storage medium relative to the imaging system and autofocus system. FIG. 3 shows the path of light RP through the imaging system. FIG. 4 shows the path of light AFP through the autofocus system.

Actuator 320 holds the data storage medium 310. The actuator 320 is useful for moving the data storage medium 310. The actuator may be used to move the data storage medium 310 laterally, to align different sectors of the data storage medium with the imaging system. The lateral movement may be linear and/or rotational movement. The actuator 320 may be used to move the data storage medium vertically, which may be useful for bringing different depths into the focus of the autofocus system and/or imaging system.

The imaging system of the read head 300 is for capturing images of groups of voxels. The imaging system may be a wide-field imaging system. The imaging system may be configured to capture an image of at least one sector of the data storage medium 310.

The imaging system includes a light source 330 and an imaging unit 340. Light source 330 may be configured to illuminate an area of the data storage medium 310 which is greater than or equal to the area of a sector. The nature of the light source 330 is not particularly limited. The use of a high-radiance light source, that is, a light source which provides a radiance of at least 3 $W/mm^2.sr$, may allow for more reliable imaging of the voxels.

The imaging unit 340 comprises at least one image sensor for capturing images of voxels in the illuminated area. An image sensor is capable of generating an image, i.e. can read a plurality of voxels in parallel as opposed to scanning individual voxels one at a time. Examples of image sensors include CCD and CMOS sensors. Smart image sensors, incorporating a processor for processing image data, may be used. An image sensor may also be referred to herein as a camera. The imaging unit 340 may have a wide field of view, i.e. may have a field of view with an area of at least 100 $\mu m^2$ and optionally in the range 125 $\mu m^2$ to 4 $mm^2$. The field of view may be at least as large as the size of a sector in the optical data storage medium, and preferably corresponds to the size of a sector and a margin around the sector.

The imaging unit 340 may include a plurality of image sensors, for example, 2 to 5 image sensors. The image sensors may be configured to generate images from light of different polarisations. One technique which is useful for reading data from a multi-layer optical storage medium is to capture multiple images using light of different polarisations simultaneously, and then to determine differences in light intensity between the images. Data can be recovered based on the differences.

The read head 300 further includes optics for focusing light onto the imaging unit 340. The optics are illustrated by lens 342. In this example, the optics 342 are operable to vary the focus of the imaging unit 340, that is to set the focus to different focal depths corresponding to different positions on the Z axis of the optical data storage medium 310. This allows images of voxels of different layers to be captured. Fixed-focus optics may be used in implementations where the actuator is configured to cause relative vertical movement between the imaging unit 340 and the optical data storage medium 310.

The light source 330 is associated with optics 332 for focusing light onto the data storage medium 310.

Typically, birefringence effects are used to allow for imaging of the voxels. Read head 300 includes a polariser 336 associated with the light source 330, such that the data storage medium 310 is illuminated with polarised light. For example, the data storage medium 310 may be illuminated with light having a plurality of different polarisations.

Imaging unit 340 is also associated with a polarizer 346. In implementations where the imaging unit 340 includes a plurality of image sensors, each image sensor may be provided with a respective polarisation filter.

Light for imaging the voxels travels along read path RP from the light source 330, through the optical data storage medium 310, and to the imaging unit 340. The read head 300 further includes ancillary optics 352, 354, 356 for defining the read path RP. The nature of the ancillary optics is not particularly limited and may be selected as appropriate. In this example, the ancillary optics include beam splitters 352, 356 and mirror 354.

The read head 300 further includes an autofocus system. The autofocus system is for sampling the optical data storage medium to identify depth positions of voxels in the multi-layer optical data storage medium 310. The focus of the imaging system may then be selected based on an output from the autofocus system. Alternatively, the focus of the imaging system may be scanned over a range of depths, and images may be captured at selected points in the scan based on an output from the autofocus system.

The autofocus system includes a light source 360 and a detector 370. The path of light AFP through the autofocus system is illustrated in FIG. 4.

The nature of the detector 370 of the autofocus system is not particularly limited, provided that the detector provides a different signal when the autofocus system is focused on a voxel compared to when the autofocus system is focused on bulk material.

Detector 370 is not necessarily configured to capture an image, and may be a photodetector or point scanner. The detector typically has a narrow field of view. For example, the detector 370 may be configured to sample an area of less than or equal to 2 $\mu m^2$.

Detector 370 may be a camera. In such implementations, the detector 370 has a smaller field-of-view and/or a lower resolution than the imaging unit 340 of the imaging system. For example, the detector may sample a field of view having an area which is less than or equal to 10%, optionally less than or equal to 5%, further optionally less than or equal to 1% of the area of the field of view of the imaging unit 340. Restricting the field of view and/or resolution allows detector 370 to sample relatively rapidly different depth locations in the optical data storage medium. Capturing a high-resolution image suitable for recovering data is relatively slow, since an image sensor operates at a finite data rate.

In this example, the autofocus system includes a light source 360 which is configured to illuminate an area on the data storage medium 310 which is to be sampled using the detector. The light source 360 of the autofocus system may be a narrow-field light source which illuminates a small area on the data storage medium 310, the area having a size which is smaller than a sector. For example, the light source 360 may illuminate an area of less than or equal to 2 $\mu m^2$. The light source 360 may comprise a laser.

The autofocus system of this example further includes focusing optics represented by lens 362 associated with the light source 360 and lens 372 associated with the detector 370. The focusing optics may be variable focus optics. Alternatively, fixed focus optics may be used, and different depths of the optical data storage medium may be brought into focus by changing the distance between the optical data storage medium and the detector 370.

The autofocus system and imaging system may be calibrated before use. For example, an optical data storage medium having voxels at known depth positions may be used as a calibration standard.

To allow for easier detection of the voxels, the autofocus system of this example further includes a polariser 364 associated with light source 360. Alternatively or additionally, detector 370 may be associated with a polarising filter. The use of polarised light allows the birefringence effects of the voxels to be used to detect their presence.

The autofocus system of this example further includes scanning optics 366. The scanning optics 366 may comprise one or more microelectromechanical scanning mirrors. The inclusion of scanning optics allows the position of the region which is sampled by the autofocus system to be varied. This may allow a larger effective area to be sampled using a narrow-field detector. In this example, the scanning optics change the position of the region on the optical storage medium which receives the light from the light source 370.

Various modifications may be made to the example read head.

The configuration of the actuator 320 is not particularly limited and may be selected as appropriate. The illustrated example has a single actuator. Any number of actuators may be present. The one or more actuators may form part of a robotic system, further comprising sensors for detecting positions of the actuators. The one or more actuators may be controllably movable in lateral (x and/or y) and/or vertical (z) directions. The actuators may be configured to provide linear and/or rotational movements. The actuators may be configured to tilt the data storage medium.

The illustrated actuator holds the optical data storage medium. Alternatively or additionally, the read head may include actuators for moving the imaging system and/or autofocus system, or for moving the detector of the autofocus system and/or the image sensor of the imaging system.

The inclusion of variable focus optics is optional. In implementations where the actuator is movable in the vertical (z) direction, the actuator may be used to bring a layer of voxels into the focus of the imaging system, by varying the distance between the optical data storage medium and the imaging system. Likewise, the position on which the autofocus system is focussed may be varied by relative movement of the autofocus system with respect to the optical data storage medium.

The inclusion of an actuator is optional, particularly if the optical storage medium has a single track.

The example shows one illustrative arrangement of lenses. The number and configuration of the lenses is not particularly limited and may be varied as appropriate.

The nature and configuration of the ancillary optics is not particularly limited, and these components may be selected as appropriate.

The inclusion of scanning optics is optional, particularly in implementations where the detector of the autofocus system is a camera.

The example includes a light source for the imaging system and a light source for the autofocus system. In a variant, a single light source is used for both imaging and autofocus.

In the illustrated example, the detector of the autofocus system is separate from the imaging unit of the imaging system. In variants, the detector and imaging unit may be housed on the same circuit board, or even the same integrated circuit, provided that the detector and imaging unit are operable independently of one another.

The illustrated example is configured for reading optical data storage media. Other implementations may further include a write system for writing data to an optical data storage medium. A write system includes at least a laser configured to form a voxel in a transparent substrate, and typically also includes associated optics. The write system may share optical components with the read system and/or autofocus system.

Figure 5:
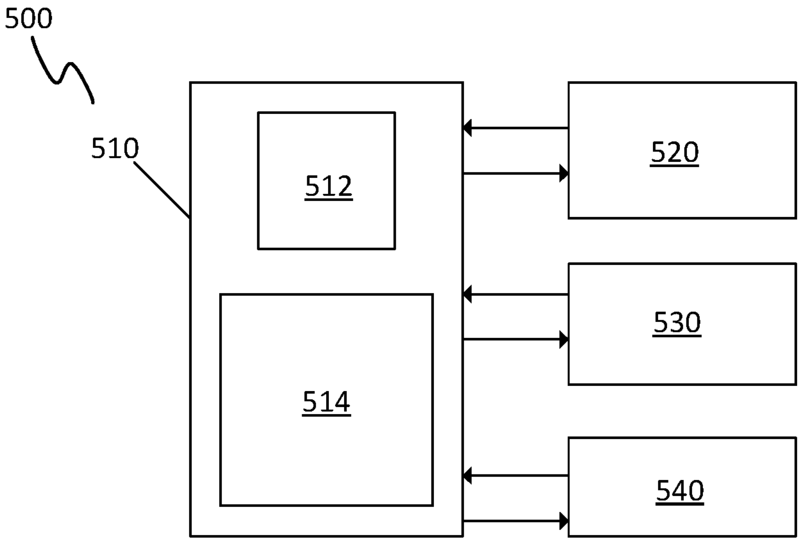
FIG. 5 is a block diagram of an example read head including a controller.

Operation of the read head may be controlled by a controller. The controller may be integrated with the read head, or may be a separate device which is in communication with the read head. A block diagram of a read head 500 operably linked to a controller 510 is shown in FIG. 5. The controller 510 comprises a processing apparatus 512 and data storage 514.

The processing apparatus 512 includes one or more processing units implemented in one or more dies, IC (integrated circuit) packages and/or housings at one or more geographic sites.

Each of the one or more processing units may take any suitable form known in the art, e.g. a general-purpose central processing unit (CPU), or a dedicated form of co-processor or accelerator processor such as a graphics processing unit (GPU), digital signal processor (DSP), etc. Each of the one or more processing units may comprise one or more cores.

The processing units may include one or more analogue processing units in addition to one or more digital processing units. The one or more analogue processing units may be configured to perform analogue signal processing, for example electronic filtering or signal conditioning. Analogue processing units may be useful for processing signals from the autofocus system.

Where it is said that a computer program is executed on the processing apparatus, this may mean execution by any one or more processing units making up the processing apparatus 512.

The processing apparatus 512 typically further comprises working memory, such as random-access memory and/or one or more memory caches within the one or more processing units.

The data storage 514 comprises one or more memory units implemented in one or more memory media in one or more housings at one or more geographic sites. The data storage 514 stores computer executable instructions which, when executed by the processing apparatus 512, cause the read head to perform operations, for example a method as described with reference to any of FIGS. 6 to 9.

Data storage 514 may further store a predetermined geometry, representing positions of voxels in an optical data storage medium. This may be useful in implementations where positions of one or more layers of voxels are to be determined by inference based on measured positions of other features of the optical data storage medium.

Each of the one or more memory units may employ any suitable storage medium known in the art, e.g. a magnetic storage medium such as a hard disk drive, magnetic tape drive etc.; or an electronic storage medium such as a solid state drive (SSD), flash memory or electrically erasable programmable read-only memory (EEPROM), etc.

The controller 510 may be configured to decode images captured by the imaging system to recover data stored on the optical data storage medium. Various computer vision techniques may be used to process the image to recover stored binary data. For example, a convolutional artificial neural network may be used. The training data for the neural network may comprise images of optical data storage media. The label for each image in the training data may correspond to data known to be encoded in the image. The loss function of the neural network may be selected to provide a measure of error in the data recovery process. Controller 510 may also be configured to perform error checking and/or to make use of parity data to recover data which cannot be read.

Alternatively, controller 510 may be configured to send the images to another device for decoding. A still further possibility is for the decoding operations to be distributed between the controller 510 and a further device. In such examples, the controller may perform pre-processing operations on the images, such as image normalisation, filtering, and/or pooling.

As illustrated in the figure, the controller 510 is in communication with the autofocus system 520, the imaging system 530 and the one or more actuators 540. The controller may be linked to the imaging system autofocus system and one or more actuators by any appropriate means, for example a wired or wireless connection or an optical fibre.

Figure 6:
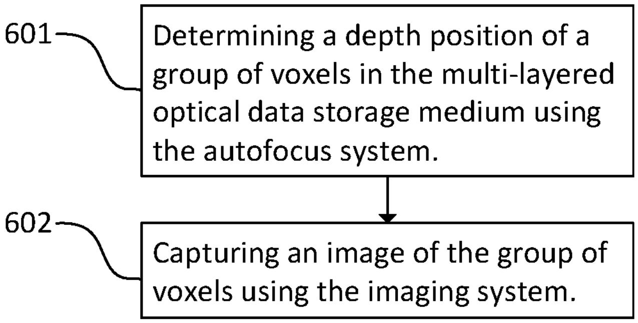
FIG. 6 is a flow diagram outlining a method of reading data from a multi-layered optical data storage medium.

A method of reading data from a multi-layered optical data storage medium using a read head as defined herein will now be described with reference to FIG. 6. FIG. 6 is a flow diagram outlining the method.

At block 601, a depth position of a group of voxels (e.g., a sector) in the multi-layered optical data storage medium is identified using the autofocus system.

This operation may comprise illuminating a field of view of the detector 370 of the autofocus system using the light source 360, sampling different depths within the field of view by bringing them into focus, and determining whether voxels are present based on an output signal from the detector. For example, there may be a change in an electrical signal generated by the detector when the focal depth corresponds to the depth position.

A narrow-field light source may have a high radiance, which may allow for easier detection of the voxels. A narrow-field detector collects less data than a wide-field imaging unit, so the rate of sampling is less constrained by the maximum rate of data collection.

The depths on which the autofocus system is focussed may be varied using variable focus optics. Alternatively, the autofocus system may have fixed-focus optics and relative movement of the optical data storage medium in the vertical direction may be used to sample different depths in the data storage medium.

The autofocus system preferably detects the positions of voxels directly. Alternatively, the autofocus system may detect the position of a marker or a surface of the optical data storage medium. In such implementations, the positions of the voxels may be inferred based on the detected position of the marker and a pre-determined optical data storage medium geometry.

At block 602, an image of the group of voxels (e.g., sector) is captured using the imaging system.

All of the voxels in the group are read simultaneously, using a wide-field imaging sensor as discussed above.

This operation may comprise capturing a plurality of images using light of different polarisation. The images may be captured simultaneously by using a plurality of image sensors in parallel. Alternatively, images of different polarisations may be captured in series, to allow images at multiple polarisations to be captured using the same image sensor.

The focus of the imaging system may be adjusted such that the focal depth of the imaging system corresponds to the depth position of the layer of voxels detected by the autofocus system. Alternatively, the focus of the imaging system may be varied continuously over a range of focal depths, and images may be captured selectively when the focal depth corresponds to the depth position of the layer of voxels. Focus may be adjusted through the use of variable focus optics, by relative movement of the optical data storage medium, or a combination thereof.

By using the autofocus system to identify the positions of the voxels, the image capture process may be made more efficient. Absolute positioning of the data storage medium relative to the imaging system is not required since the locations of voxels can be detected using the autofocus system. At the same time, image capture may be selective: there is no requirement to take images at focal depths where voxels are not in focus. This may allow more efficient use to be made of the imaging sensor. Imaging sensors have finite framerates, with the speed at which images can be collected being constrained by the maximum data rate of the sensor.

After block 602, images of one or more further groups of voxels may be captured. The operations of block 601 may serve to calibrate the read head. After calibrating the autofocus system, the positions of subsequent groups of voxels may be inferred based on a predetermined optical data storage medium geometry. The operations of block 601 may be repeated selectively to re-calibrate the read head.

For example, it may be desirable to read sectors which are arranged in a plurality of tracks.

Aligning the read head with a track typically comprises relative lateral movement between the data storage medium and the read head. The operations of block 601 may be repeated after each lateral movement, e.g. for at least the first sector to be read in each track. Alternatively, the operations of block 601 may be performed for sectors in a first track, and then repeated after a predetermined number of subsequent tracks has been read.

A still further possibility is to monitor the quality of the images and to repeat block 601 if image quality falls below a predetermined threshold. Monitoring image quality may comprise determining whether the images are in focus. Monitoring image quality may comprise determining whether an amount of data greater than or equal to a predetermined threshold can be recovered from the images (e.g., based on the output of the loss function of an artificial neural network).

The use of inference is optional, and the operations of block 601 may be repeated for each group of voxels to be imaged.

The method outlined in FIG. 6 may be implemented in various ways. One example approach will now be described with reference to FIG. 7.

The autofocus system may be used to scan a range of focal depths. At the same time, the focus of the imaging system may be scanned over the range. Image capture by the imaging system may be triggered selectively when the imaging system is focused at a focal depth corresponding to a depth position of a layer of voxels.

The scans may have the different phases. The difference between the phases may be selected such that any given depth is scanned by the autofocus system before the focus of the imaging system reaches that depth. In other words, the autofocus system looks ahead of the imaging system. When the autofocus system detects voxels at a depth, the imaging system is caused to capture an image once the imaging system reaches that depth. The imaging system captures an image after a time delay corresponding to the phase difference between the two scans.

The phase difference may be selected to account for any delays in communication between the autofocus system, controller, and imaging system and/or any delays in the processing of signals by the controller. The phase difference may take into account the maximum capture rate of the imaging system.

Figure 7:
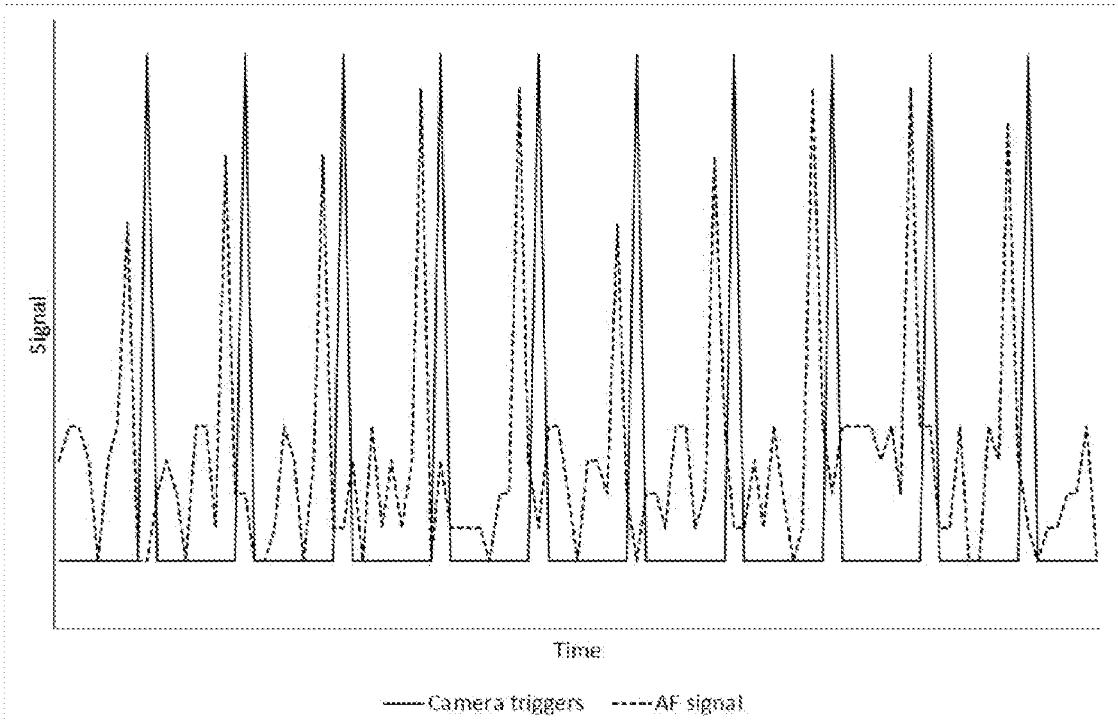
FIG. 7 is a plot showing the timing of signals received from an autofocus system and imaging sensor triggers in an example implementation of the method of FIG. 6.
Figure 8:
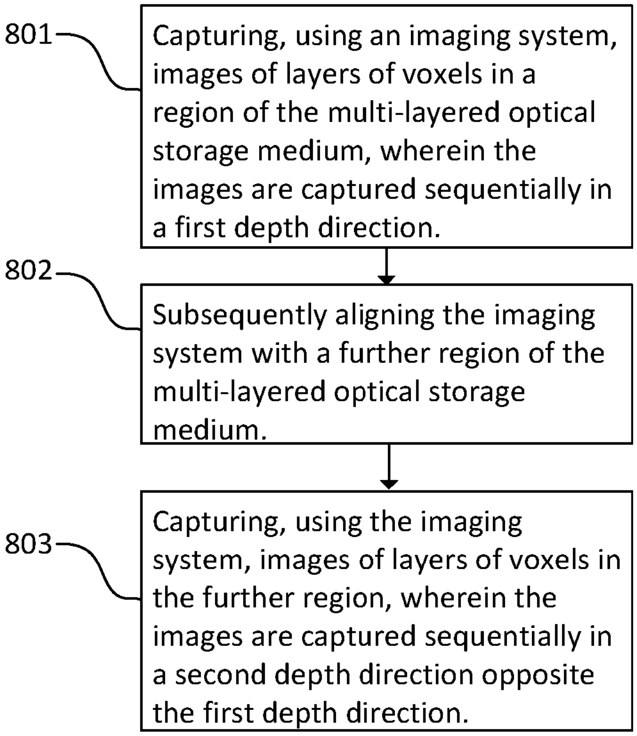
FIG. 8 is a flow diagram outlining a method of scanning a multi-layered optical data storage medium.

FIG. 7 is a plot showing autofocus signals and image capture triggers. As may be seen, image capture occurs just after detection of layer of voxels. By selecting the rate of the scans, it may be possible to capture images at a frame rate which approaches the maximum frame rate of the imaging system.

Figure 9:
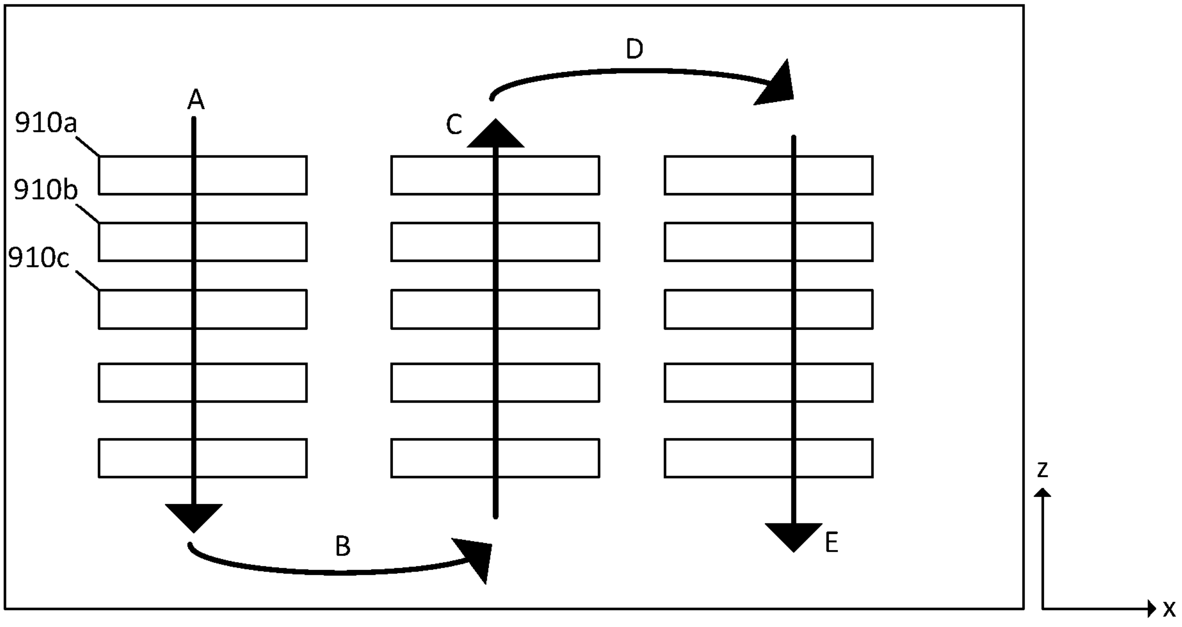
FIG. 9 shows a scan path through a multi-layered optical data storage medium, in an example implementation of the method according to FIG. 8.

This method may allow for efficient reading of tracks in the optical data storage medium. Another method for scanning a multi-layer optical data storage medium is illustrated in the flow diagram of FIG. 8. FIG. 9 shows a scan path in accordance with the method of FIG. 8. This method may be performed using a read head as described herein, but is also compatible with other types of read head. The method of FIG. 8 may optionally be used in combination with the method of FIG. 6.

At block 801, images of sectors in a first track are captured using an imaging system. The images are captured sequentially in a depth direction. The multi-layered optical data storage medium and imaging system are held at fixed lateral positions during the capture of the images. This operation corresponds to arrow A in FIG. 9, which illustrates a scan proceeding down a track of sectors 910*a*, 910*b*, 910*c*.

The relative vertical positions of the optical data storage medium and the imaging system may be changed, in order to bring different depth positions within the optical data storage medium into the focus of the imaging system. Alternatively, variable focus optics may be used to focus the imaging system onto different sectors in the track.

In the illustrated example, the depth direction is a downward direction.

In implementations where a single imaging sensor is to be used to capture images at a plurality of different polarisations, a scan may be performed in a first depth direction using a first polarisation.

Subsequently the polarisation may be changed, and the direction of the scan may be reversed. These operations may be repeated until sets of images at each desired polarisation have been captured, reversing the direction of the scan at each iteration.

After imaging the sectors in the first track, at block 802, the imaging system may be aligned with a further track. This operation corresponds to arrow B in FIG. 9.

Operation 802 comprises moving the optical data storage medium and/or imaging system laterally. For example, the optical data storage medium may be mounted on a stage, and the stage may move the optical data storage medium linearly relative to the imaging system, or may rotate the optical data storage medium. Alternatively or additionally, the imaging system may be mounted on a movable arm or gantry for moving the imaging system relative to the optical data storage medium.

Other types of actuator may be used.

The direction of the scan in the vertical axis is reversed for each sector. The reversal and the lateral movement may take place simultaneously, causing the scan to follow a generally U-shaped path, as illustrated by arrow B.

At block 803, images of layers of voxels in the further track are captured. This operation is illustrated by arrow C in FIG. 9, which shows the scan proceeding in an upwards direction.

The scan of the second track proceeds in a vertical direction which is opposite to the direction of the immediately preceding scan. In the illustrated example, each track is imaged once, with the first track being scanned downwardly and the second track being scanned upwardly. As mentioned above, imaging a track may comprise a plurality of scans of that track in implementations where a single camera is to be used to capture images at multiple different polarisations.

By performing scans of stacks in alternating directions, the scanning process may be made more efficient since there is less delay between completing the scan of one track and beginning the scan of the next track. A scan of this type may be described as following a serpentine path.

The operations of blocks 801 to 803 may be repeated until all of the desired data has been read.

This is illustrated by arrows D and E in FIG. 9.

The extent of the lateral movements of the optical data storage medium and/or imaging system are desirably kept as small as possible between scans of tracks. For example, if an optical data storage medium has a plurality of tracks arranged in rows and columns and reading the entire contents of the medium is desired, the track selected for each iteration of the method may be directly adjacent to the track scanned in the immediately preceding iteration. The scans may proceed along one row of stacks in the +x direction, then move to the next row and proceed in the −x direction, and so on. The scans may follow a serpentine pattern in the xz plane, and a serpentine path in the xy plane.

It will be appreciated that the above embodiments have been described by way of example only.

More generally, according to one aspect disclosed herein, there is provided a read head for reading a multi-layered optical data storage medium, the multi-layered optical data storage medium comprising a transparent substrate having layers of voxels embedded therein. The read head comprises an imaging system for capturing images of groups of voxels, wherein the read head is configured to bring the imaging system into focus on variable depths in a multi-layered optical data storage medium; and an autofocus system for identifying depth positions of voxels in the multi-layered optical data storage medium. The autofocus system comprises: a light source for illuminating an area on the multi-layered optical data storage medium; and a detector for detecting light from the light source transmitted through the multi-layered optical data storage medium. The autofocus system allows for the detection of depth positions of voxels, thereby allowing the imaging system to be used selectively to capture images which are focussed on voxels.

The autofocus system may further comprise variable focus optics for varying a focal depth of the autofocus system. The imaging system may include variable focus optics for varying a focal depth of the imaging system.

The imaging system may include at least one actuator configured to cause relative movement between the multi-layered optical data storage medium and the imaging system and/or autofocus system.

The imaging system may be a wide-field imaging system, having a field of view with an area of at least 100 $\mu m^2$, optionally in the range 125 $\mu m^2$ to 4 $mm^2$. The autofocus system may be configured to sample a narrow field of view having an area of less than or equal to 10 $\mu m^2$, optionally less than or equal to 2 $\mu m^2$.

The at least one actuator may be configured to cause a movement having a lateral component. An optical data storage medium may comprise voxels arranged in tracks. An actuator which is configured to cause lateral movement may allow the imaging system to be aligned with a selected track.

The at least one actuator may be configured to cause a movement having a vertical component. This may allow the actuator to be used to bring the imaging system and/or autofocus system into focus on variable depth positions in the multi-layered optical data storage medium, e.g. on sectors within a track.

The at least one actuator may be configured to move the multi-layered data storage medium relative to the imaging system and autofocus system. The movement may include linear and/or rotational components.

The at least one actuator may be configured to move the detector relative to the multi-layered data storage medium. The at least one actuator may be configured to move an imaging sensor of the imaging system relative to the multi-layered data storage medium.

The autofocus system may have a field of view having an area which is less than or equal to 10% of an area of a field of view of the imaging system, optionally less than or equal to 1% of the area of the field of view of the imaging system. For example, the area sampled by the autofocus system may be a point. A point may be a region having an area of less than or equal to 2 $\mu m^2$. Sampling a limited area may allow for faster sampling.

The detector may be configured to detect voxels in the multi-layered optical data storage medium. In other words, the detector of the autofocus system may identify the positions of the voxels by detecting the voxels themselves.

Alternatively or additionally, the multi-layered optical data storage medium may be provided with markers for marking the depth positions of the voxels, and the detector may be configured to detect such markers.

Alternatively or additionally, the autofocus system may be configured to detect the position of a surface of the multi-layered optical data storage medium.

The autofocus system may further comprise scanning optics for moving the area to be sampled. Scanning over the optical data storage medium allows a larger effective region to be sampled, which may allow for the more reliable detection of voxels.

The light source of the autofocus system may be a laser. The light source may be configured to provide a radiance of at least 3 $W/mm^2$.st. The use of a high intensity light source may allow for easier detection of the voxels. The light source of the autofocus system may for example be a laser.

Voxels exhibit birefringence, and polarized light may be used. For example, the autofocus system may further comprise a polarizer for polarising light from the light source. Alternatively or additionally, the detector may include a polarizing filter.

The detector may be a photodetector, optionally provided with a polarizing filter.

The read head may be for reading a multi-layered optical data storage medium in which the voxels are arranged in sectors of a predetermined size. In such implementations, the imaging system may be a wide-field imaging system for capturing images of an area having a size greater than or equal to the predetermined size. Capturing an image which includes a margin around the sector of interest may provide tolerance of lateral alignment. Alternatively or additionally, in implementations where the optical data storage medium includes markers for marking the locations of voxels, capturing an image which is larger than a sector allows the marker to be arranged in the margin.

The imaging system may be configured to capture an image of one sector at a time.

The imaging system may include a second light source and polarizing optics for illuminating a region of the multi-layered optical data storage medium with polarized light; and at least one imaging sensor for capturing polarized light from the light source transmitted through the multi-layered optical data storage medium. The light source and polarizing optics of the imaging system may provide light having a plurality of different polarizations.

The imaging system may include a plurality of imaging sensors for capturing light of respective ones of the polarizations. By providing a plurality of imaging sensors, a plurality of images of a given group of voxels may be captured simultaneously. Determining differences between images captured using light of different polarisations is one operation which may be useful for decoding data stored in the optical data storage medium.

In implementations where the imaging system includes a single imaging sensor, a plurality of images of different polarisations may be captured consecutively.

The read head may further comprise a controller operably linked to the imaging system and the autofocus system. The controller may be useful for causing the read head to perform a method as defined herein.

The controller may be configured to determine, using the autofocus system, a depth position of a feature on or in the multi-layered data storage medium. The feature may be selected from a surface of the multi-layered optical data storage medium; a marker on a surface of the multi-layered optical data storage medium; a marker embedded in the optical data storage medium; and one or more voxels in the optical data storage medium. Preferably, the feature is one or more voxels. The controller may be configured to infer, based on the determined depth position and a predetermined geometry of the multi-layered data storage medium, the depth position of a group of voxels. Alternatively, the position of each group of voxels to be imaged may be detected using the autofocus system.

The controller may be configured to determine, using the autofocus system, a depth position of a group of voxels in the multi-layered optical data storage medium; and, in response to the determination, to cause the imaging system to capture an image of the group of voxels.

The controller may be configured such that determining the depth position of the group of voxels comprises scanning a range of focal depths using the autofocus system. The controller may be configured to scan the focal depth of the imaging system over the range of focal depths, and to capture an image selectively at a focal depth corresponding to the depth position of the group of voxels.

The controller may be configured such that the scan performed by the autofocus system and the scan performed by the imaging system have different phases, the phases being selected such that each focal depth in the range is scanned by the autofocus system before the imaging system. This may allow more efficient use of the imaging system, since imaging sensors have finite maximum data capture rates. For example, the rate of capture of images of groups of voxels may approach the maximum framerate of the imaging system.

In implementations where the read head includes at least one actuator and a controller, the controller may be configured to cause the imaging system to capture images of one or more target sectors or layers of voxels in a region of the multi-layered optical data storage medium, and then subsequently to align the read head with a different region of the multi-layered optical data storage medium using the actuator, and repeat the capture operation. The different region may be an immediately adjacent region. When the controller is configured to perform scans of focal depths, the direction of the scan may alternate for each region. For example, the scan may proceed downwards in the first region, and upwards in the second region. This may allow data to be read faster, by avoiding the need to reset the focus of the imaging system and autofocus system to a zero point for each region.

The controller may be further configured to send image data to a decoder configured to recover binary data based on the image. The controller may perform pre-decoding operations. The controller may perform image normalisation, filtering and/or pooling. For example, in implementations where multiple images are captured, the controller may calculate image data corresponding to differences between the multiple images.

Alternatively, the controller may itself be configured to decode the image to recover binary data stored on the optical data storage medium.

In another aspect, there is provided a method of reading data from a multi-layered optical data storage medium. The method may be implemented using a read head as described hereinabove. It should be appreciated that all features described with reference to the read head may be implemented in the context of the method.

The method comprises: identifying a depth position of a group of voxels in the multi-layered optical data storage medium using an autofocus system; and capturing an image of the group of voxels using an imaging system having a focal depth corresponding to the identified depth position.

The autofocus system comprises: a light source for illuminating a point on the multi-layered optical data storage medium; and a detector for detecting light from the light source transmitted through the multi-layered optical data storage medium. Use of the autofocus system may allow more efficient utilisation of the imaging system. Data read-out from the imaging system may be relatively slow in comparison with scanning by the autofocus system, since the autofocus system may have a smaller field of view and/or lower resolution.

The autofocus system may further comprise variable focus optics for varying a focal depth of the autofocus system.

Identifying the depth position of the group of voxels may include performing a scan of a range of depths using the autofocus system.

The imaging system may perform a scan of a range of focal depths. The imaging system may selectively capture an image when the focal depth of the imaging system corresponds to a depth position of a group of voxels.

The scan performed by the imaging system and the scan performed by the autofocus system may have respective phases which differ by a phase difference. The phase difference may be selected such that each focal depth in the range is scanned by the autofocus system before the focus of the imaging system reaches that depth.

The method may comprise: capturing, sequentially in a first depth direction, images of layers of voxels in a region of the multi-layered optical data storage medium; subsequently aligning the imaging system with a region of the multi-layered optical data storage medium; capturing, sequentially in a second depth direction opposite the first depth direction, images of layers of voxels in a further region of the multi-layered optical data storage medium. By alternating scans between upward and downward directions, image capture may be made more efficient by avoiding returning the focus of the autofocus system and image capture system to a zero point for each region.

In a still further aspect, there is provided a method of reading data from a multi-layered optical storage medium. The method may optionally be used in combination with the method of the preceding aspect and may be performed using a read head as defined herein.

The method comprises: capturing, using an imaging system, images of layers of voxels in a first track, wherein the multi-layered optical data storage medium and imaging system are held at fixed lateral positions during the capture of the images.

Capturing the images of the sectors may comprise capturing a plurality of images of each sector using light of different polarizations.

The method may further comprise: after capturing the images, aligning the imaging system with a further track by moving the imaging system and/or multi-layered optical data storage medium laterally; reversing a direction of change of focus of the imaging system; and capturing images of sectors in the further track sequentially in the reversed direction. The further track may be immediately adjacent to the first track.

The method may further comprise determining vertical positions of sectors in the first track. The images may be captured selectively at the determined vertical positions.

The imaging system may be used to determine the vertical positions. Alternatively, the vertical positions of the sectors may be determined using an autofocus system to detect the positions of voxels. The autofocus system may be an autofocus system of a read head as described herein. The determination may be performed in accordance a method as described herein.

Determining the vertical positions of the sectors may comprise: detecting a vertical position of a feature of the multi-layered optical data storage medium; and inferring the vertical positions of the sectors based on the vertical position of the feature and a predetermined optical data storage medium geometry. The feature may be selected from a surface of the multi-layered optical data storage medium; a marker on a surface of the multi-layered optical data storage medium; a marker embedded in the optical data storage medium; and one or more voxels in the optical data storage medium. In particular, the feature may be one or more voxels. Once the read head has been calibrated by detecting a vertical position of one or more features, the positions of sectors in the optical data storage medium may be inferred from a predetermined geometry of the optical data storage medium. This may allow for faster retrieval of data.

For example, the method may further comprise: inferring, based at least in part on the vertical positions of sectors in one track, vertical positions of sectors in another track.

A plurality of tracks may be read. The first track may be read in a first depth direction, e.g. downward, and the second track may be read in a second depth direction, e.g. upward. By performing scans in alternating directions, it may be made possible to retrieve data more quickly, by avoiding a need to reset the focus of the imaging system to a reference point before reading each track.

The present disclosure provides the following clauses:

Clause 1. A read head for reading a multi-layered optical data storage medium, the multi-layered optical data storage medium comprising a transparent substrate having layers of voxels embedded therein, which read head comprises:
- an imaging system for capturing images of groups of voxels, wherein the read head is configured to bring the imaging system into focus on variable depths in a multi-layered optical data storage medium; and
- an autofocus system for identifying depth positions of voxels in the multi-layered optical data storage medium by sampling an area in the multi-layered optical data storage medium;
- wherein the autofocus system comprises:
  - a light source for illuminating the area; and
  - a detector for detecting light from the light source transmitted through the multi-layered optical data storage medium.

Clause 2. The read head according to Clause 1, wherein the autofocus system further comprises variable focus optics for varying a focal depth of the autofocus system.

Clause 3. The read head according to Clause 1 or Clause 2, wherein the imaging system includes variable focus optics for varying a focal depth of the imaging system.

Clause 4. The read head according to any preceding Clause, wherein the autofocus system is configured to sample an area having a size which is less than or equal to 10%, optionally less than or equal to 1%, of a size of a field of view of the imaging system.

Clause 5. The read head according to any preceding Clause, wherein the detector is configured to detect voxels in the multi-layered optical data storage medium.

Clause 6. The read head according to any preceding Clause, wherein the autofocus system further comprises scanning optics for moving the area sampled by the autofocus system.

Clause 7. The read head according to any preceding Clause, wherein the light source is a laser.

Clause 8. The read head according to any preceding Clause, wherein the autofocus system further comprises a polarizer for polarising light from the light source.

Clause 9. The read head according to any preceding Clause, further comprising at least one actuator configured to cause relative movement between the multi-layered optical data storage medium and the imaging system and/or autofocus system.

Clause 10. The read head according to Clause 9, wherein the at least one actuator is configured to cause relative movement between the multi-layered optical data storage medium and the imaging system and/or the autofocus system in a vertical direction so as to vary the focus of the imaging system and/or the autofocus system.

Clause 11. The read head according to any preceding Clause, wherein the read head is for reading a multi-layered optical data storage medium in which the voxels are arranged in sectors of a predetermined size, and wherein the imaging system is for capturing images of a field of view having an are greater than or equal to the predetermined size.

Clause 12. The read head according to any preceding Clause, wherein the imaging system includes:
- a second light source and polarizing optics for illuminating a field of view of the imaging system with polarized light; and
- at least one image sensor for capturing polarized light from the second light source transmitted through the multi-layered optical data storage medium.

Clause 13. The read head according to Clause 12, wherein the second light source and polarizing optics are configured to provide light having a plurality of different polarizations, and wherein the imaging system includes a plurality of imaging sensors for capturing light of respective ones of the plurality of different polarizations.

Clause 14. The read head according to any preceding Clause, further comprising a controller operably linked to the imaging system and the autofocus system, wherein the controller is configured to:
- determine, using the autofocus system, a depth position of a group of voxels in the multi-layered optical data storage medium; and
- in response to the determination, cause the imaging system to capture an image of the group of voxels.

Clause 15. The read head according to Clause 14, wherein the controller is configured such that:
- determining the depth position of the group of voxels comprises scanning a range of focal depths using the autofocus system; and
- wherein the controller is configured to cause the read head to:
  - scan a focal depth of the imaging system over the range of focal depths; and
  - capture an image selectively when the focal depth of the imaging system corresponds to the depth position of the group of voxels.

Clause 16. The read head according to Clause 15, wherein the controller is configured such that the scan performed by the autofocus system and the scan performed by the imaging system have different phases, the phases being selected such that focal depths in the range are scanned by the autofocus system before the imaging system.

Clause 17. The read head according to any of Clauses 14 to 16, wherein the read head includes at least one actuator, and wherein the controller is configured to cause the imaging system to capture images of each layer of voxels in a region of the multi-layered optical data storage medium, and then subsequently to control the at least one actuator to align the read head with a different region of the multi-layered optical data storage medium.

Clause 18. The read head according to any of Clauses 14 to 17, wherein the controller is further configured to send the image to a decoder configured to recover binary data based on the image.

Clause 19. A method of reading data from a multi-layered optical data storage medium, the multi-layered optical data storage medium comprising a transparent substrate having layers of voxels embedded therein, which method comprises:

determining a depth position of a group of voxels in the multi-layered optical data storage medium by sampling the multi-layered optical data storage medium using an autofocus system; and capturing an image of the group of voxels using an imaging system having a focal depth corresponding to the depth position;

wherein the autofocus system comprises:

a light source for illuminating an area on the multi-layered optical data storage medium;

a detector for detecting light from the light source transmitted through the multi-layered optical data storage medium.

Clause 20. The method according to Clause 19, wherein the autofocus system further comprises variable focus optics for varying a focal depth of the autofocus system.

Clause 21. The method according to Clause 19 or Clause 20, wherein determining the depth position of the group of voxels includes performing a scan of a range of depths using the autofocus system.

Clause 22. The method according to Clause 21, wherein the imaging system performs a scan of a range of focal depths, and wherein the imaging system selectively captures an image when the focal depth of the imaging system corresponds to a depth position of a group of voxels.

Clause 23. The method according to Clause 22, wherein the scan performed by the imaging system and the scan performed by the autofocus system have respective phases which differ by a phase difference, the phase difference being selected such that each focal depth in the range is scanned by the autofocus system before the imaging system.

Clause 24. The method according to any of Clauses 19 to 23, comprising:

capturing, sequentially in a first depth direction, images of layers of voxels in a region of the multi-layered optical data storage medium;

subsequently aligning the imaging system with a further region of the multi-layered optical data storage medium;

capturing, sequentially in a second depth direction opposite the first depth direction, images of layers of voxels in the further region of the multi-layered optical data storage medium.

Clause 25. A method of reading data from a multi-layered optical storage medium, the multi-layered optical data storage medium comprising a transparent substrate having layers of voxels embedded therein, the voxels being arranged in sectors and the sectors being arranged in vertical tracks, which method comprises:

capturing, using an imaging system, images of sectors in a first track;

wherein the multi-layered optical data storage medium and imaging system are held at fixed lateral positions during the capture of the images.

Clause 26. The method according to Clause 25, wherein capturing the images of the sectors comprising capturing a plurality of images of the sectors using light of different polarizations.

Clause 27. The method according to Clause 25 or Clause 26, further comprising:

after capturing the images, aligning the imaging system with a further track by moving the imaging system and/or multi-layered optical data storage medium laterally;

reversing a direction of change of focus of the imaging system; and capturing images of sectors in the further track sequentially in the reversed direction.

Clause 28. The method according to Clause 27, wherein the further track is immediately adjacent to the first track.

Clause 29. The method according to any of Clauses 25 to 28, further comprising determining vertical positions of sectors in the first track.

Clause 30. The method according to Clause 29, wherein the images are captured selectively at the determined vertical positions.

Clause 31. The method according to Clause 29, wherein the imaging system (530) is used to determine the vertical positions.

Clause 32. The method according to Clause 29, wherein determining the vertical positions of the sectors comprises using an autofocus system to detect the positions.

Clause 33. The method according to any of Clauses 29 to 30, wherein determining the vertical positions of the sectors comprises:

detecting a vertical position of a feature of the multi-layered optical data storage medium; and inferring the vertical positions of the sectors based on the vertical position of the feature and a predetermined optical data storage medium geometry.

Clause 34. The method according to any of Clauses 29 to 33, further comprising:

inferring, based at least in part on the vertical positions of sectors in one track, vertical positions of sectors in another track.

Clause 35. The method according to Clause 33 or Clause 34, wherein the feature is selected from a surface of the multi-layered optical data storage medium; a marker on a surface of the multi-layered optical data storage medium; a marker embedded in the optical data storage medium; and one or more voxels in the optical data storage medium.

Also provided herein is a read head for reading a multi-layered optical data storage medium, the multi-layered optical data storage medium comprising a transparent substrate having layers of voxels embedded therein. The read head comprises a controller, an autofocus system, and a camera. The autofocus system and the camera are operably linked to the controller. The autofocus system comprises a light source configured to illuminate an area in the multi-layered optical data storage medium; and a light detector arranged to detect light from the light source transmitted through the multi-layered optical data storage medium. The controller comprises a processor and a non-transitory computer readable medium storing program instructions which, when executed by the processor, cause the processor to:

determine, based on an output of the detector of the autofocus system, a depth position of a group of voxels in the multi-layered optical data storage medium; and, in response to the determination, capture an image of the group of voxels using the camera.

Other variants or use cases of the disclosed techniques may become apparent to the person skilled in the art once given the disclosure herein. The scope of the disclosure is not limited by the described embodiments but only by the accompanying claims.

The invention claimed is:

1. A read head for reading a multi-layered optical data storage medium, the multi-layered optical data storage medium comprising a transparent substrate having layers of voxels embedded therein, which read head comprises:
   - a controller;
   - an actuator;
   - an imaging system operably linked to the controller, the imaging system capturing an image of a group of voxels, wherein the actuator brings the imaging system into focus on variable depths in the multi-layered optical data storage medium; and
   - an autofocus system operably linked to the controller, the autofocus system identifying depth positions of the group of voxels in the multi-layered optical data storage medium including sampling an area in the multi-layered optical data storage medium;
   - wherein the autofocus system comprises:
     - a light source, the light source illuminating the area; and
     - a detector, the detector detecting light from the light source transmitted through the multi-layered optical data storage medium; and
   - wherein the controller:
     - determines, using the autofocus system, a depth position of the group of voxels in the multi-layered optical data storage medium; and
     - in response to the determination, causes the imaging system to capture the image of the group of voxels.

2. The read head according to claim 1, wherein:
   - i) the autofocus system further comprises a first variable focus optics, the first variable focus optics varying a focal depth of the autofocus system; and/or
   - ii) the autofocus system further comprises a polarizer, the polarizer polarising light from the light source; and/or
   - iii) the autofocus system further comprises scanning optics, the scanning optics moving the area sampled by the autofocus system; and/or
   - iv) the imaging system includes a second variable focus optics, the second variable focus optics varying a focal depth of the imaging system.

3. The read head according to claim 1, wherein:
   - i) the read head reads the multi-layered optical data storage medium in which the group of voxels are arranged in sectors of a predetermined size, and the imaging system captures images of a field of view having an area greater than or equal to the predetermined size; and/or
   - ii) the autofocus system samples the area having a size which is less than or equal to 10% of a size of a field of view of the imaging system.

4. The read head according to claim 1,
   - wherein the actuator causes relative movement between the multi-layered optical data storage medium and the imaging system and/or the autofocus system in a vertical direction so as to vary the focus of the imaging system and/or the autofocus system.

5. The read head according to claim 1, wherein the imaging system includes:
   - a second light source and polarizing optics, the second light source and polarizing optics illuminating a field of view of the imaging system with polarized light; and
   - an image sensor, the imaging sensor capturing polarized light from the second light source transmitted through the multi-layered optical data storage medium.

6. The read head according to claim 5, wherein the second light source and polarizing optics provide light having a plurality of different polarizations and the imaging system includes a plurality of imaging sensors that capture light of respective ones of the plurality of different polarizations.

7. The read head according to claim 1, wherein the controller
   - determines the depth position of the group of voxels by scanning a range of focal depths using the autofocus system; and
   - wherein the controller causes the read head to:
   - scan a focal depth of the imaging system over the range of focal depths; and
   - capture an image selectively when the focal depth of the imaging system corresponds to the depth position of the group of voxels;
   - wherein the scan performed by the autofocus system and the scan performed by the imaging system have different phases, wherein the controller selects from the different phases such that the focal depths in the range are scanned by the autofocus system before the imaging system.

8. The read head according to claim 1, wherein the controller causes the imaging system to capture images of each layer of voxels in a region of the multi-layered optical data storage medium, and then subsequently controls the actuator to align the read head with a different region of the multi-layered optical data storage medium.

9. A method of reading data from a multi-layered optical data storage medium, the multi-layered optical data storage medium comprising a transparent substrate having layers of voxels embedded therein, which method comprises:
   - determining a depth position of a group of voxels in the multi-layered optical data storage medium by sampling the multi-layered optical data storage medium using an autofocus system; and
   - capturing an image of the group of voxels using an imaging system having a focal depth corresponding to the depth position;
   - wherein the autofocus system comprises:
   - a light source for illuminating an area on the multi-layered optical data storage medium;
   - a detector for detecting light from the light source transmitted through the multi-layered optical data storage medium.

10. The method according to claim 9, wherein determining the depth position of the group of voxels includes performing a scan of a range of focal depths using the autofocus system;
   - wherein the imaging system performs a scan of the range of focal depths,
   - wherein the imaging system selectively captures the image when the focal depth of the imaging system corresponds to the depth position of the group of voxels, and
   - wherein the scan performed by the imaging system and the scan performed by the autofocus system have respective phases which differ by a phase difference, the phase difference being selected such that each focal depth in the range of focal depths is scanned by the autofocus system before the imaging system.

11. The method according to claim 9, comprising:

capturing, sequentially in a first depth direction, images of layers of voxels in a region of the multi-layered optical data storage medium;

subsequently aligning the imaging system with a further region of the multi-layered optical data storage medium; and capturing, sequentially in a second depth direction opposite the first depth direction, images of layers of voxels in the further region of the multi-layered optical data storage medium.

12. The method according to claim 9, wherein:

the voxels are arranged in sectors and the sectors are arranged in vertical tracks, the determining comprises determining vertical positions of sectors in a first track;

the capturing comprises capturing, using the imaging system, images of the sectors in the first track;

the multi-layered optical data storage medium and imaging system are held at fixed lateral positions during the capture of the images;

the images are captured selectively at the determined vertical positions; and wherein capturing the images of the sectors comprising capturing a plurality of images of the sectors using light of different polarizations.

13. The method according to claim 12, further comprising:

after capturing the images, aligning the imaging system with a further track by moving the imaging system and/or the multi-layered optical data storage medium laterally;

reversing a direction of change of focus of the imaging system; and capturing images of sectors in the further track sequentially in the reversed direction.

14. The method according to claim 12, further comprising inferring, based at least in part on the vertical positions of the sectors in the first track, vertical positions of sectors in another track.

15. The method according to claim 14, wherein inferring the vertical positions of the sectors comprises:

detecting a vertical position of a feature of the multi-layered optical data storage medium; and inferring the vertical positions of the sectors based on the vertical position of the feature and a predetermined optical data storage medium geometry; and wherein the feature is selected from a surface of the multi-layered optical data storage medium, a marker on a surface of the multi-layered optical data storage medium, a marker embedded in the multi-layered optical data storage medium, and one or more voxels in the multi-layered optical data storage medium.

16. A method for reading data from a multi-layered optical data storage medium, the method comprising:

sampling an area in the multi-layered optical data storage medium using an autofocus system, wherein the autofocus system comprises a light source and a detector, wherein the light source illuminates the area on the multi-layered optical data storage medium, wherein the detector detects light from the light source transmitted through the multi-layered optical data storage medium;

based on the sampling, identifying a depth position of a group of voxels in the multi-layered optical data storage medium; and capturing an image of the group of voxels in the multi-layered optical data storage medium using an imaging system having a focal depth corresponding to the depth position.

17. The method of claim 16, wherein the autofocus system comprises one or more of: a first variable focus optics that varies a focal depth of the autofocus system, a polarizer that polarizes light from the light source, scanning optics that moves the area sampled by the autofocus system, and a second variable focus optics that varies the focal depth of the imaging system.

18. The method of claim 16, further comprising:

causing, using an actuator of a read head, relative movement between the multi-layered optical data storage medium, and the imaging system and/or the autofocus system in a vertical direction so as to vary focus of the imaging system and/or the autofocus system.

19. The method of claim 16, wherein the autofocus system samples the area having a size which is less than or equal to 10% of a size of a field of view of the imaging system.

20. The method of claim 16, wherein the autofocus system samples the area having a size which is less than or equal to 1%, of a size of a field of view of the imaging system.

* * * * *